United States Patent

Woods

[11] Patent Number: 5,974,934
[45] Date of Patent: Nov. 2, 1999

[54] APPARATUS FOR MAKING A BOWL FROM A LOAF OF BREAD

[76] Inventor: Charles Woods, 51 Kingswood Rd., Oakville, Ontario, Canada, L6K 2E2

[21] Appl. No.: 08/954,557

[22] Filed: Oct. 20, 1997

[51] Int. Cl.[6] ........................................ B26D 3/00
[52] U.S. Cl. ................... 83/861; 83/760; 83/761; 83/781; 83/468.3; 83/468.6; 83/613; 83/823; 83/697; 83/860; 83/932; 99/551
[58] Field of Search ............... 83/861, 875, 879, 83/932, 781, 760, 761, 188, 468.2, 468.3, 468.6, 823, 821, 827, 697, 860, 613; 99/515, 551; 269/909

[56] References Cited

U.S. PATENT DOCUMENTS

| | | | |
|---|---|---|---|
| 2,004,286 | 6/1935 | Ketner | 83/760 X |
| 2,104,278 | 1/1938 | Schultz | 83/761 |
| 2,207,754 | 7/1940 | Neary | 83/468.6 |
| 2,262,991 | 11/1941 | D'Arrigo | 83/468.2 X |
| 2,609,048 | 9/1952 | Samans et al. | 83/861 X |
| 2,841,193 | 7/1958 | Petrofsky | 83/861 |
| 2,970,624 | 2/1961 | Lundell | 83/468.2 X |
| 4,685,364 | 8/1987 | Scheflow et al. | 83/468.2 X |
| 4,892,020 | 1/1990 | Kozyrski et al. | 83/879 X |
| 5,557,998 | 9/1996 | Schwarz et al. | 83/932 X |
| 5,603,253 | 2/1997 | Logan | 83/875 |
| 5,732,610 | 3/1998 | Halladay et al. | 83/860 X |
| 5,758,557 | 6/1998 | Moreton | 83/468.3 X |
| 5,878,643 | 3/1999 | Hwang | 83/932 X |

*Primary Examiner*—Rinaldi I. Rada
*Assistant Examiner*—Charles Goodman
*Attorney, Agent, or Firm*—Bereskin & Parr

[57] ABSTRACT

A device for hollowing out food products such as loaves of hemispherically shaped bread for the purpose of using the hollowed out loaf as a bowl for food. The device has a knife for cutting into the loaf and a loaf platform for holding the loaf of bread. The platform and knife are angled so that the cutting action removes a uniform sized conical section of bread from the central region of the loaf. The knife is mounted in restricted manner so that it will penetrate the loaf for cutting of the cone but will not pass through the loaf.

14 Claims, 8 Drawing Sheets

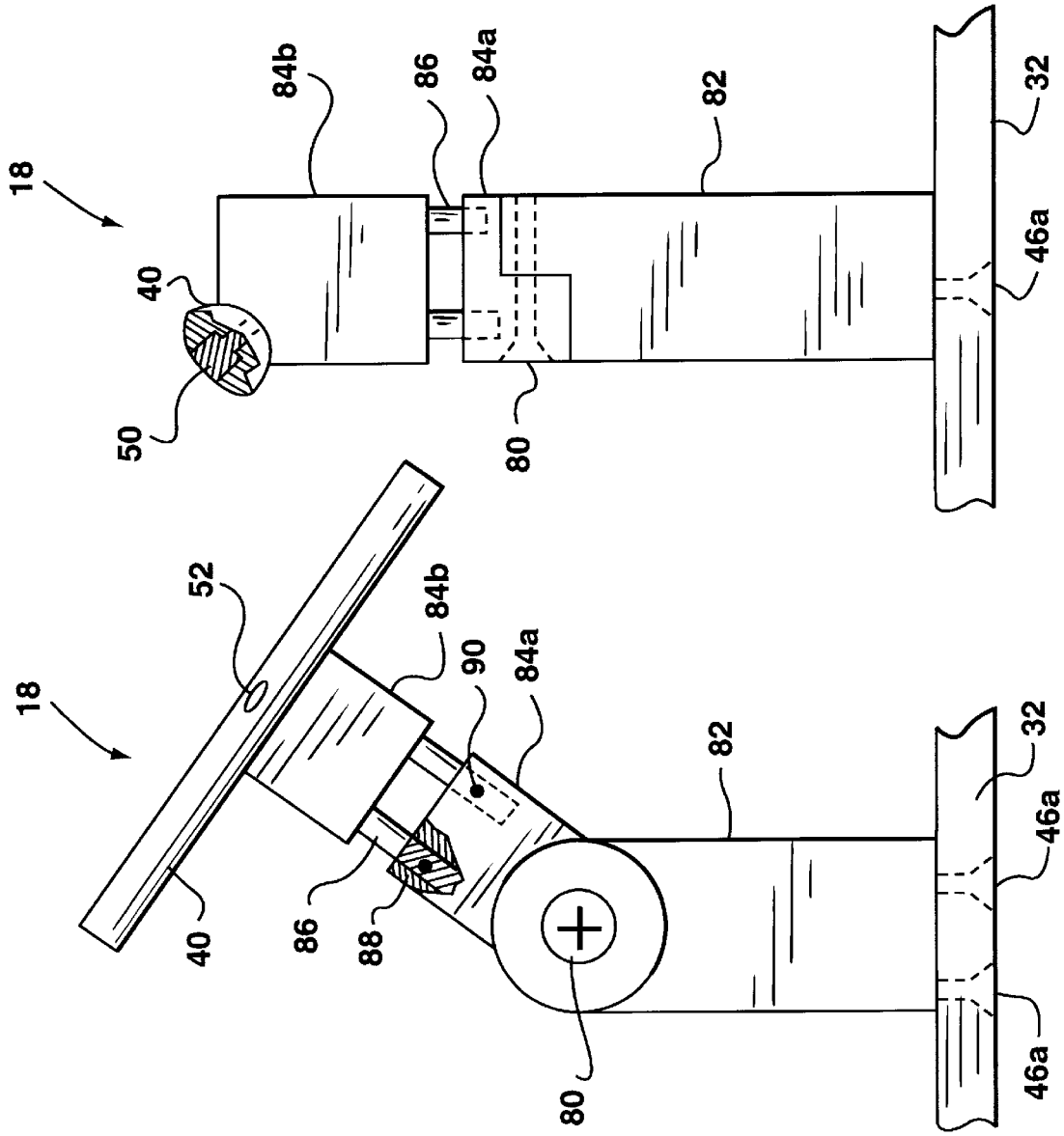

APPARATUS FOR MAKING A BOWL FROM A LOAF OF BREAD

FIELD OF THE INVENTION

This invention relates to a food preparation apparatus, in particular, an apparatus that creates a cavity in a food product such as a loaf of bread so that the loaf may be used as a bowl for food.

BACKGROUND OF THE INVENTION

It is desired within the food preparation industry to hollow out generally hemispherically shaped food products such as loaves or buns of bread to create a bowl for food. Typically such hollowed out loaves are used as a bowl for foods such as chili or soup. Hollowed out food products have two distinct advantages over conventional bowls; they are edible and environmentally friendly. They can be eaten if desired or discarded. Being composed of organic matter, such bowls may be readily composted. If simply discarded, an organically based bowl rapidly decomposes and does not threaten the environment. Being a one use receptacle, such bowls require no cleaning after use and thus do not waste the energy, water and detergent required to clean conventional bowls. Although the invention is applicable to food products generally it will be discussed hereinafter with respect to bread like items such as a loaf of bread or bun.

Hollowing out a loaf to create a bowl has traditionally been done in a free hand manner by an individual using a knife or spoon to cut or scoop out a cavity in the bread. Such a procedure is prone to error in that a slip of the knife may cut the individual. In addition, free hand cutting can result in piercing of the exterior of the loaf when attempting to cut the cavity. A pierced loaf will leak when liquids are placed within the bowl. Further, the cavity of the bowl created by such free hand cutting will be inconsistent in dimension. The food preparation industry requires that a bowl hold a fixed and consistent volume to ensure customer satisfaction and profitability. Typically, a cavity in a bread bowl is cut out in a cylindrical shape. A cylinder is not easy to create within a loaf, particularly when attempting to detach the base of the cylinder from the loaf.

Thus, there is a need for an apparatus to allow an individual in the food preparation industry to safely create a bowl from a loaf of bread that has a consistently sized cavity. The present invention meets this need.

SUMMARY OF THE INVENTION

A device for making a bowl from a generally hemispherically shaped food product. The device comprises a base, food product supporting apparatus for supporting a food product connected to the base and cutting apparatus for guiding a cutting edge from a position where the cutting apparatus does not contact the food product to a position where the cutting apparatus contacts the food product, but does not pass through the food product.

BRIEF DESCRIPTION OF THE DRAWINGS

For a better understanding of the present invention, and to show more clearly how it may be carried into effect, reference will now be made, by way of example, to the accompanying drawings which show a preferred embodiment of the present invention and in which:

FIG. 7 is a side plan view of an alternative embodiment of a portion of the apparatus of FIG. 1 with a portion broken away;

FIG. 8 is a side plan view of an alternative embodiment of a portion of the apparatus of FIG. 1 with a portion broken away and expanded in scale;

DETAILED DESCRIPTION OF THE INVENTION

Figure 1:
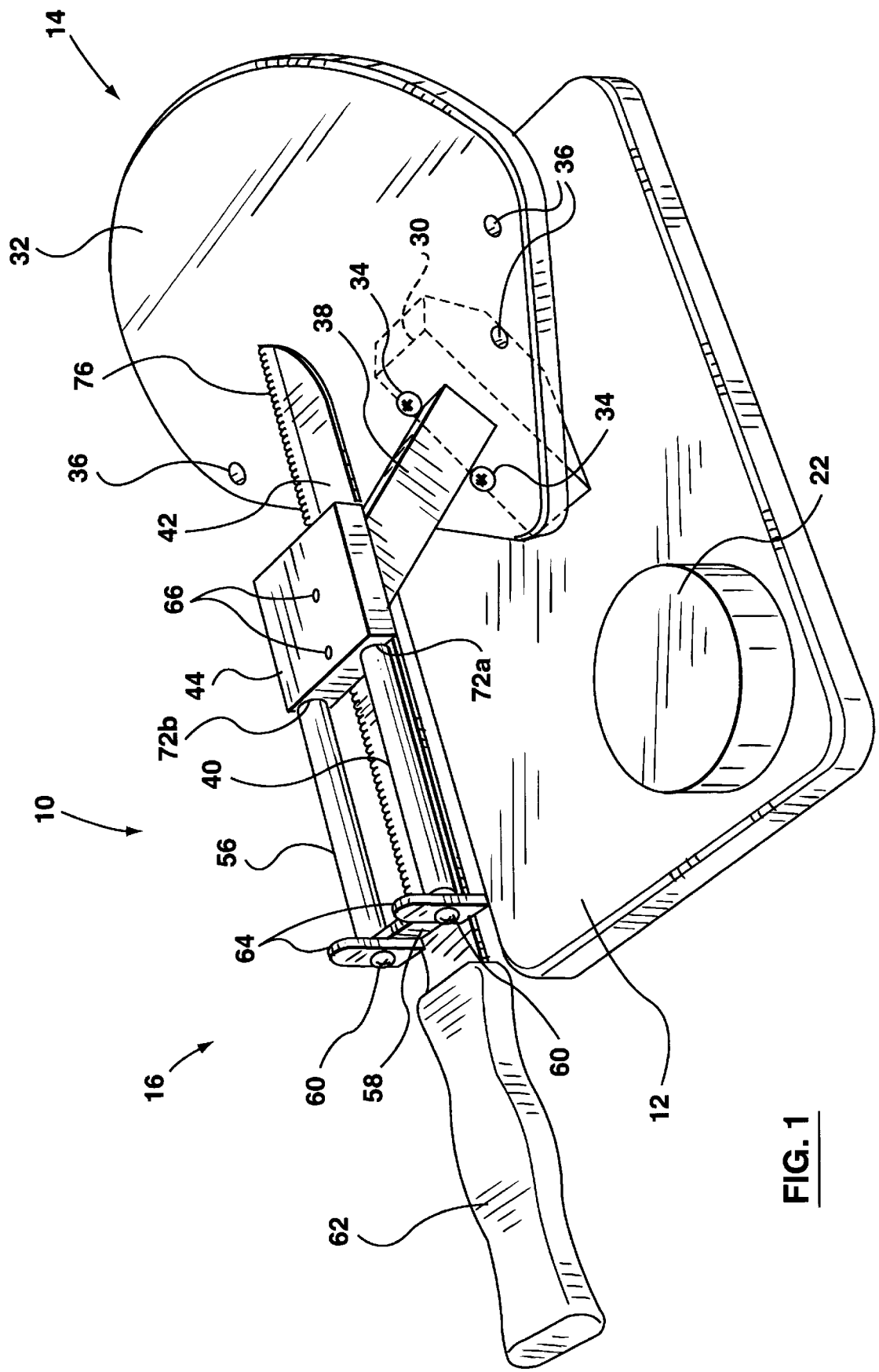
FIG. 1 is a perspective view of an apparatus embodying the present invention intended for forming a bowl in a loaf of bread.

Referring first to FIG. 1, a perspective view of the preferred embodiment of the present invention is shown generally as 10. The device has a base 12, a loaf supporting means 14 and a cutting means 16.

Figure 2:
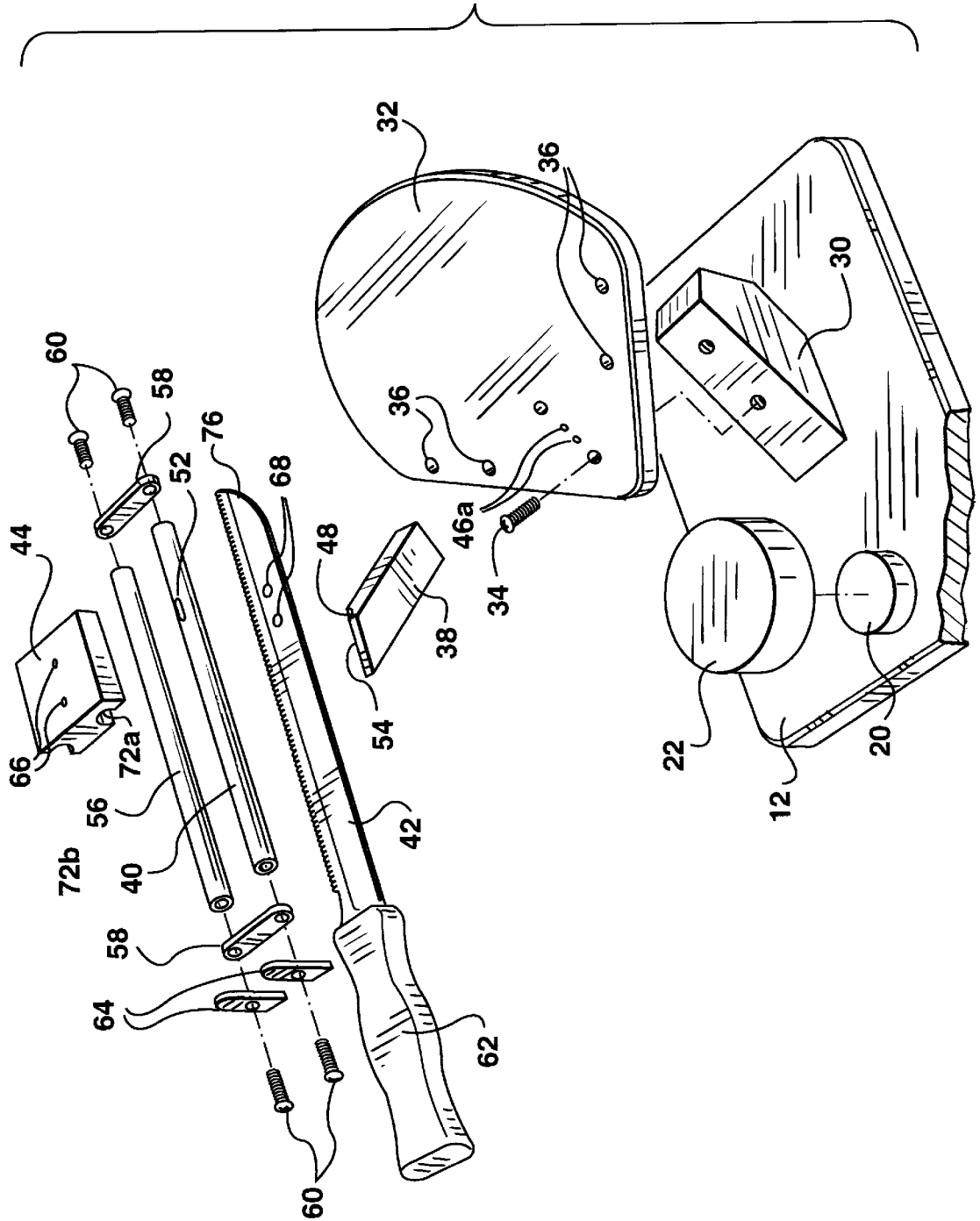
FIG. 2 is an exploded parts view of the apparatus of FIG. 1.
Figure 3:
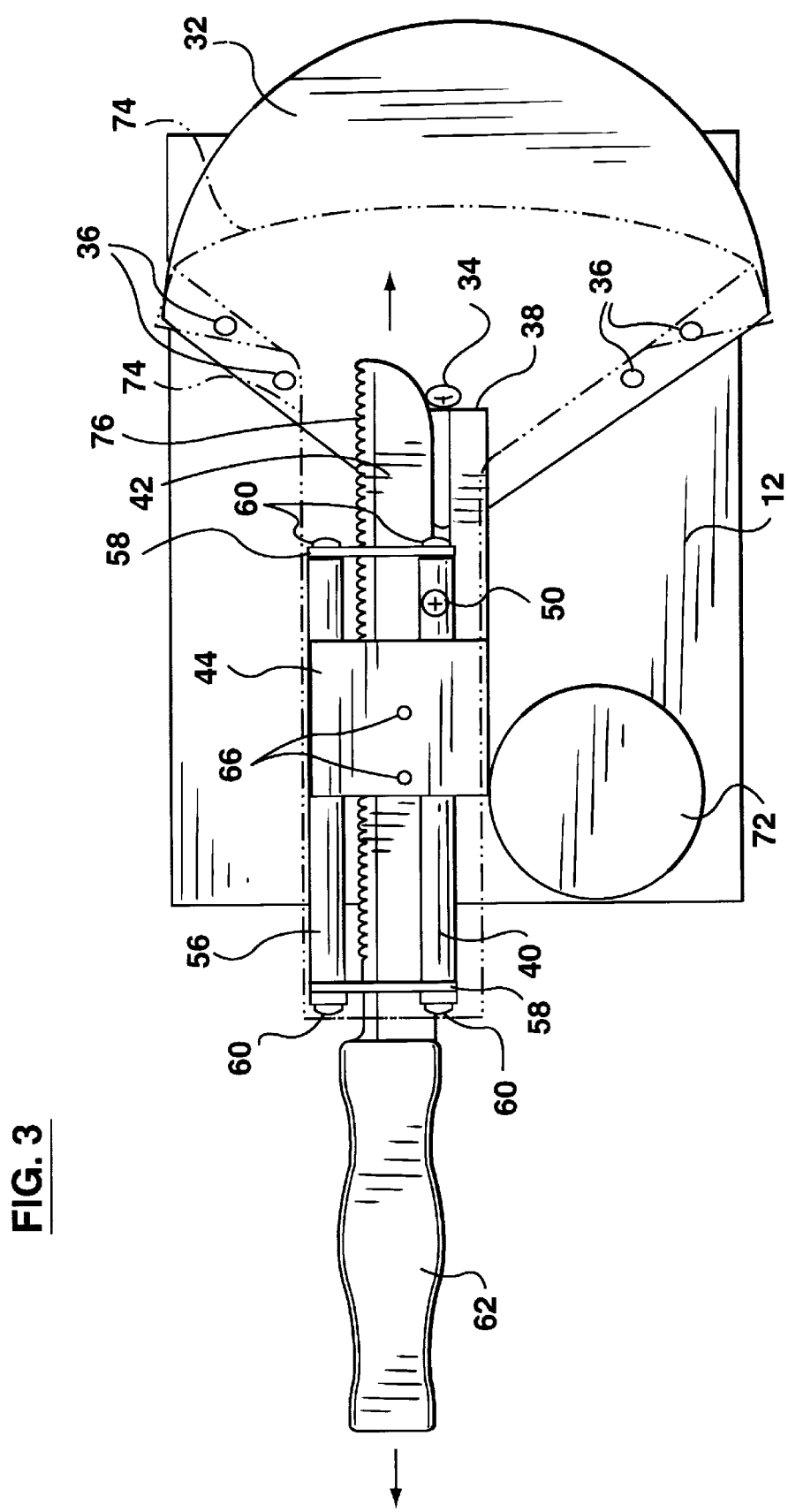
FIG. 3 is a top plan view of the apparatus of FIG. 1.
Figure 5:
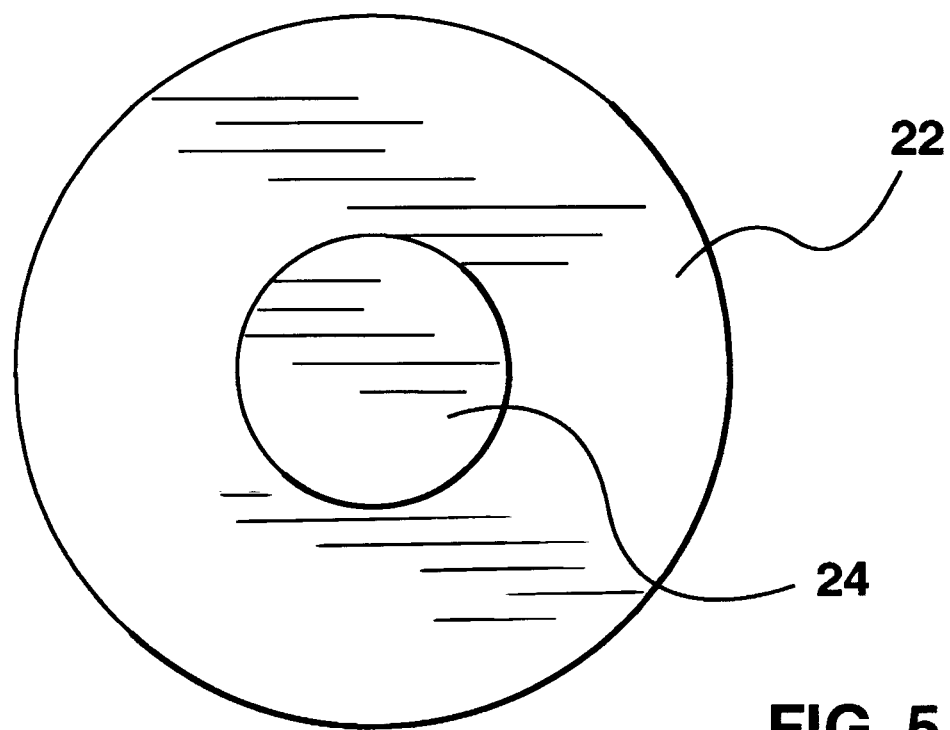
FIG. 5 is a bottom plan view of the mandrel of the apparatus of FIG. 1.

The base 12 includes a mandrel support boss 20. The base 12 provides a stable support for the mandrel support boss 20 (FIG. 2) and the loaf supporting means 14. The mandrel support boss 20 is releasably attached to the base 12 by a screw (not shown). A mandrel 22 rests on the mandrel support boss 20. The mandrel 22 has a mandrel cavity 24 (FIG. 5) which matches the dimensions of the mandrel support boss 20.

The loaf supporting means 14 includes a platform support 30 (FIG. 2), and a cutting platform 32. The platform support 30 is secured to the base 12 by a plurality of screws (not shown) extending from the underside of the base 12. The cutting platform 32 is secured to the platform support 30 by platform support screws 34. Platform support 32 also contains guard retaining holes 36 to be discussed later.

Figure 4:
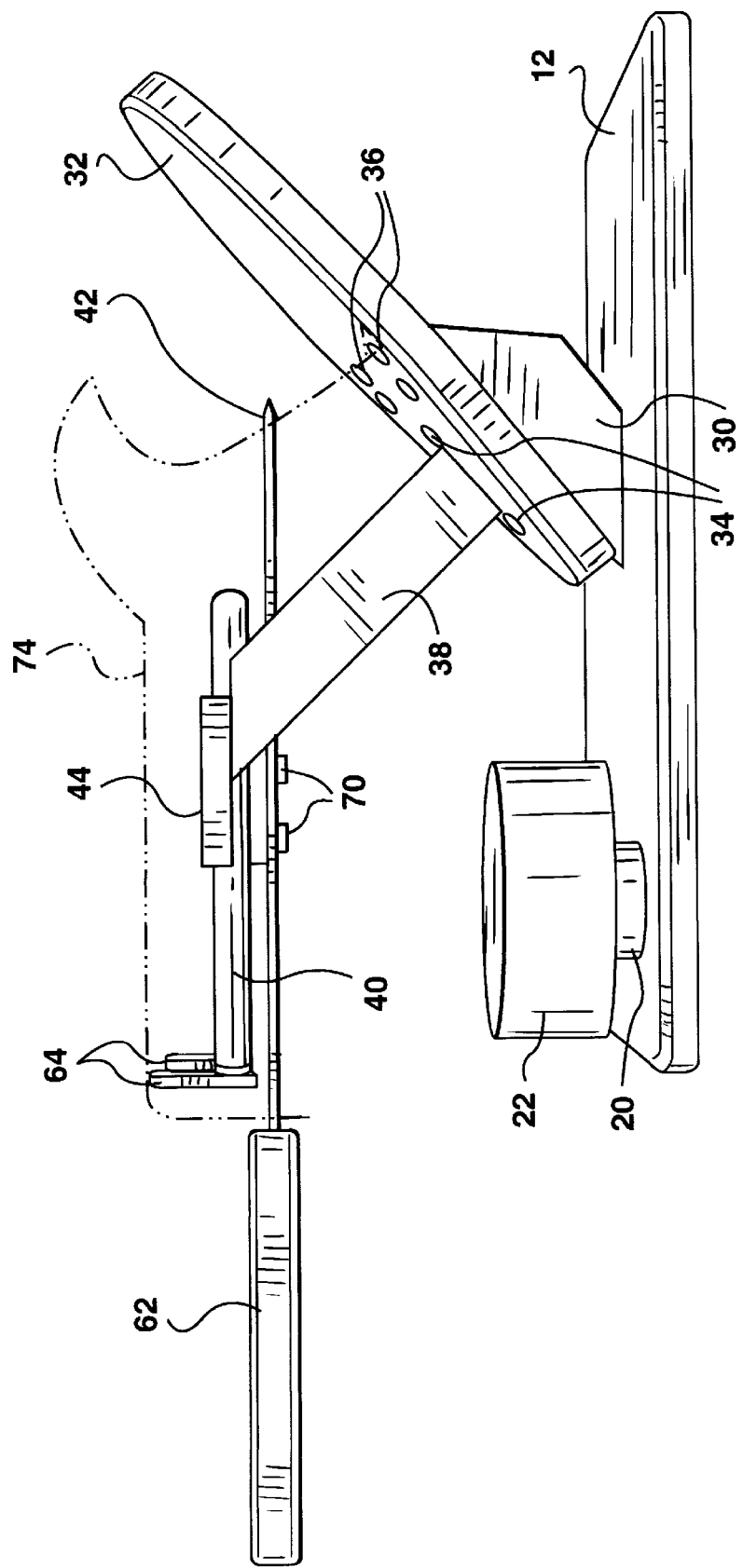
FIG. 4 is a side plan view of the apparatus of FIG. 1.
Figure 6:
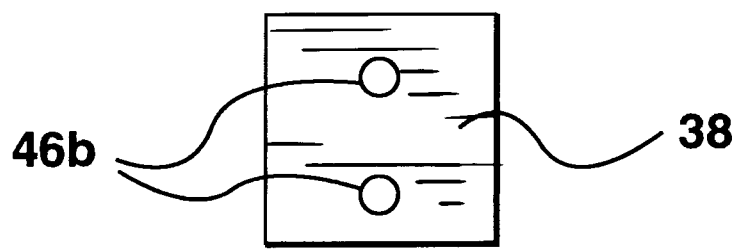
FIG. 6 is a bottom plan view of the cutter support of the apparatus of FIG. 1.
Figure 10:
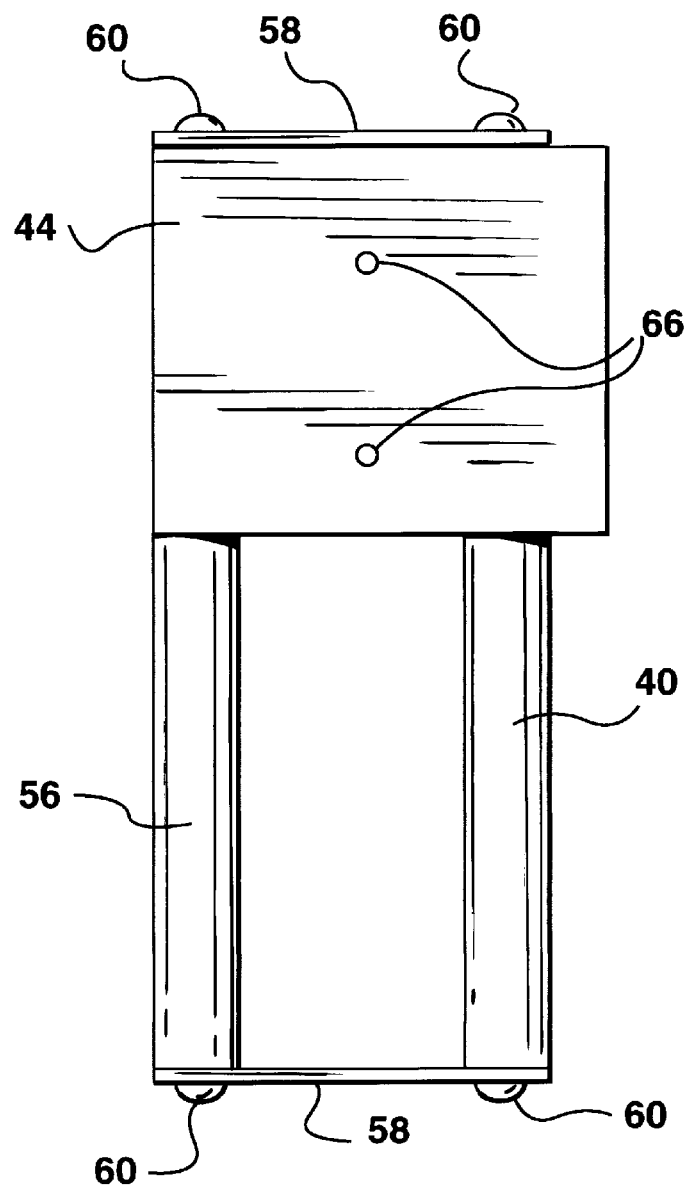
FIG. 10 is a partial top plan view of the apparatus of FIG. 1 showing the knife guide block and guide rails.

The cutting means 16 includes a cutter support 38, a supporting guide rail 40, a knife blade 42 and a knife guide block 44. The cutter support 38 is connected to the cutting platform 32 by screws (not shown) extending from the underside of the cutting platform 32, through the cutter support base screw holes 46a (FIG. 2) in the cutting platform 32 and into the cutter support base screw holes 46b (FIG. 6) in the base of the cutter support 38. A guide rail support groove 48 is located at the top of the cutter support 38, and is designed to accept the peripheral surface of a supporting guide rail 40. The supporting guide rail 40 is secured in the guide rail support groove 48, by a guide rail support screw 50 which extends through a guide rail screw hole 52 into a cutter support top screw hole 54. The supporting guide rail 40 has an associated guide rail 56. The guide rail 56 is supported by the guide rail 40. The guide rails 40 and 56 are kept parallel by guide rail spacers 58 which are attached to the ends of the guide rails by guide rail retaining screws 60. The ends of the guide rails nearest the knife handle 62 have a pair of cutting guard supports 64 connected to the end of the guide rails on top of the guide rail spacer 58. A knife blade 42 30 is connected to a knife guide block 44 by a pair of knife guide block bolts 66. The knife guide block bolts 66 extend from the top of the knife guide block 44 through the knife blade holes 68 and are secured to the underside of the knife blade 42 by the knife guide block nuts 70 (FIG. 4). The knife guide block 44 contains two knife guide block grooves 72a and 72b (FIG. 10) which are designed to partially enclose and slide upon the tube like Cylindrical guide rails 40 and 56 respectively.

FIG. 4, is a side plan view of the embodiment of FIG. 1. cutting guard 74 is releasably mounted to the cutting platform 32 by bolts or screws through the guard retaining holes 36. The cutting guard covers the cutting means 16 and a portion of the cutting platform 32. The cutting guard 74 is supported above the cutting means 16 by the cutting guard supports 64.

Figure 9:
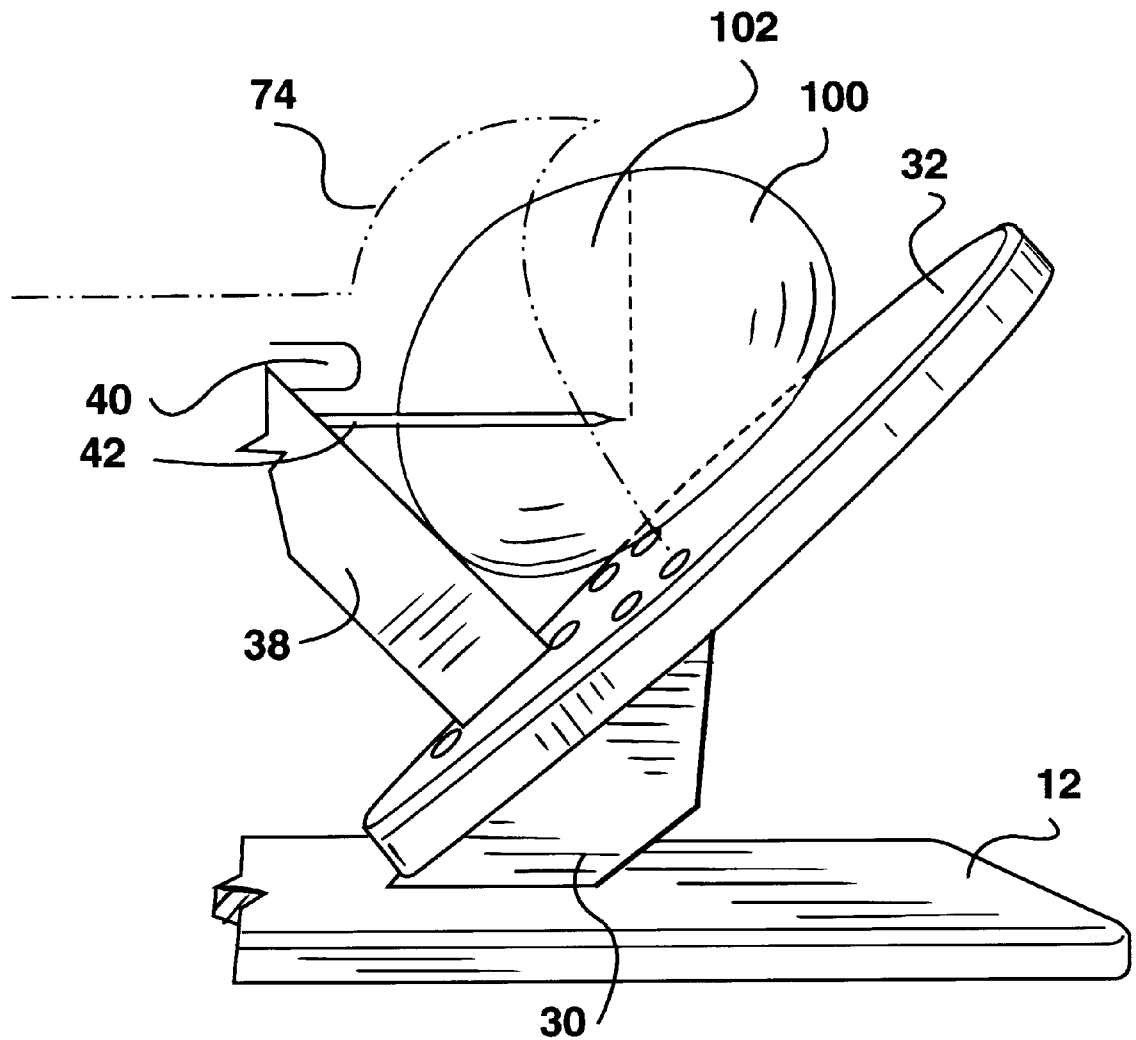
FIG. 9 is a partial view of the apparatus of FIG. 1 showing a cone of bread being cut from a loaf.
Figure 11:
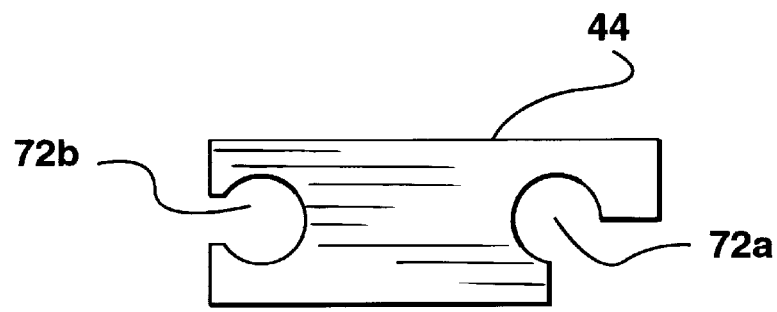
FIG. 11 is an end plan view of the knife guide block of FIG. 10.

In use, as shown in FIG. 9, a hemispherically shaped loaf of bread or a bun 100, is placed upon the cutting platform 32, within the cutting guard 74. The cutter support 38 acts as a stop to retain the loaf on the cutting platform 32. The internal edges at the base of the cutting guard 74 aid in centering the loaf upon the cutting platform 32. It is desirable to have the loaf placed on the platform so that the point contacted by the knife blade 42 at its limit of travel toward the cutting platform 32 is substantially at the center of the loaf. This ensures that the conic section cut from the loaf is generally central to the loaf and of a uniform size. Once the loaf has been inserted, the user pushes the knife blade 42 into the loaf until the motion of the knife is stopped when the knife guide block 44 contacts the guide rail spacer 58 at the right hand end as viewed in FIG. 1. The user then rotates the loaf on the cutting platform in a direction that will engage a cutting edge 76. While rotating the loaf, the user simultaneously grasps the knife handle 62 and uses the knife handle 62 to cause the knife guide block 44 and the attached knife blade 42 to move the cutting edge 76 longitudinally along the knife guide rails 40 and 56 as needed to assist in cutting the bread.

The cutting platform 32 is located at an angle with respect to the knife blade 42 so that as the knife guide block 44 slides longitudinally along the knife guide rails 40 and 56, in a sawing motion, while the loaf is rotated, the cutting edge 76 cuts a conical section from the loaf. The knife guide block 44 and thus the knife blade 42 are restricted in their longitudinal motion by the guide rail spacers 58 at either end of the guide rails 40 and 56. The guide rail spacers 58 define how deeply the knife blade 42 may penetrate the loaf and further prevent the knife blade 42 from being removed from the cutting means 16.

Once the conical section has been cut, the loaf is removed from the cutting platform 32 and the enclosing cutting guard 74. The conical piece of bread 102 is then extracted from the loaf by pulling it out by hand. The now hollowed out loaf of bread is then placed cavity side down upon the mandrel 22 and pressed onto the mandrel 22. This pressing serves to create a larger and relatively uniform cylindrical cavity within the loaf. The pressing of the loaf upon the mandrel also compacts the bread which results in a less liquid permeable container than if left unpressed.

Although the present invention has been described in the preferred embodiment, several other embodiments are to be considered. The cutter support 38 may be replaced with a pivotable and extendable support 18 as shown in FIG. 7 and FIG. 8. As shown in FIGS. 7 and 8, the pivotable and extendable support 18 replaces the cutter support 38. The pivotable and extendable support 18 includes a hinge screw 80, a lower arm 82 and an upper arms 84a and 84b. The lower arm 82 is pivotally connected to the upper arm 84a by the adjustable hinge screw 80. The upper arm 84a is connected to the upper arm 84b by a plurality of extension pins 86 which are fixed within either the upper arm 84a or the upper arm 84b. In FIG. 7 the extension pins 86 shown fixed in upper arm 84b are free to slide within the pin cavity 88 contained within the upper arm 84a. The extension pins 86 can be prevented from moving when in an adjusted position by set screws 90. By utilizing the pivotable and extendable support 18, the cutting angle of the knife blade 42 may be adjusted by simply pivoting the upper support arms 84a and 84b about hinge screw 80. The result of this pivoting is to change the point of entry of the knife blade 42 into the loaf. It is desirable to have the loaf placed on the platform so that the approximate center of the loaf is the point contacted by the knife blade 42. This ensures that the conic section cut from the loaf is central to the loaf and of a uniform size. If the size of the loaves used vary, than it may be necessary to pivot the pivotable and extendable support to ensure the conic section cut is central to the loaf. The extension function of the pivotable and extendable support is useful when it is necessary to raise the knife blade 42 further above the platform 32. This may be necessary in the case of a loaf with a higher dome than the loaves usually cut. In order to adjust the blade 42 for the high dome loaf, it may be necessary to raise the knife blade 42 higher above the loaf.

The aforementioned pivoting need not be restricted to one plane. For example, a universal ball joint similar to those in common use in the head of a camera tripod would allow for a freer range of movement.

In another embodiment the cutting means may not be connected to the loaf supporting means, but rather mounted separately to the base 12. In such a configuration one or both of the cutting means 16 and the loaf supporting means 14 may be mounted on pivotable and extendable supports.

The present invention is preferably constructed from food grade plastic, save for the assorted screws and bolts, the knife blade 42, the cutting guard supports 64, the guide rail spacers 58 and the knife guide rails 40 and 56 which are preferably made from stainless steel.

The present invention is designed in such a manner that all components may be disassembled for cleaning. Thus, all components are connected with screws in threaded holes or bolts with nuts. In particular, the knife blade 42 is detachable from the knife guide block 44 so that the knife may be sharpened or replaced. The knife handle 62 is preferably designed for ambidextrous use. Further, the knife blade 42 may have an edge facing either way or be double edged.

The present invention depicts the mandrel base 20 and mandrel 22 mounted on the base 12. Another embodiment would place the mandrel base 20 and mandrel 22 on a structure not integrated into the base 12.

I claim:

1. An apparatus for making a bowl from a generally hemispherically shaped food product, comprising:
    a) a base;
    b) food product supporting means for supporting said food product, said food product supporting means including a cutting platform, said cutting platform having a substantially planar support surface, said food product supporting means connected to said base; and
    c) cutting means operatively connected to said base, said cutting means having a cutting blade, said blade having a substantially straight cutting edge, said cutting means further having guiding means, said guiding means guiding and limiting movement of said cutting edge in a movement direction parallel to said straight cutting edge, between first and second positions, said cutting edge when in said first position not contacting said food product when said food product is supported by said food product supporting means and said cutting edge when in said second position extending into but not through said food product when said food product is supported by said food product supporting means and wherein said movement direction intersects said planar support surface at an acute angle, so that upon rotation of said food product upon said food product supporting means, said cutting edge will cut a substantially conical block of material from said food product when said cutting edge is in said second position.

2. An apparatus as claimed in claim 1; wherein said food product supporting means comprises:

a cutting platform support, said cutting platform support releasably connecting said cutting platform to said base.

3. An apparatus as claimed in claim 2 further comprising a cutting guard, said cutting guard covering said cutting means and a portion of the food product supporting means, said cutting guard serving to guard a user from contact with said cutting edge.

4. An apparatus as claimed in claim 2; wherein said cutting platform support further comprises adjustment means, for adjusting a vertical angle of said cutting edge relative to a horizontal plane.

5. An apparatus as claimed in claim 4, wherein said adjustment means further comprises means for adjusting a length of said cutter support.

6. An apparatus as claimed in claim 2; wherein said platform support comprises pivot means.

7. An apparatus as in claim 2; wherein said platform support comprises adjustment means for extending said platform support.

8. An apparatus as claimed in claim 2; wherein said cutting blade of said cutting means further comprises a knife, said knife comprising a knife handle, a knife blade and said cutting edge and said guiding means comprising;

a) a knife guide block;

b) a plurality of knife guide block rails;

c) said knife guide block comprising grooves adapted to receive said knife guide block rails so that said knife guide block may slide along said knife guide block rails;

d) said knife blade releasably attached to said knife guide block;

e) a cutter support, said cutter support releasably attached to at least one of said knife guide block rails; and f) said cutter support releasably attached to said cutting platform.

9. An apparatus as claimed in claim 8, wherein said knife guide block rails are cylindrical in cross section.

10. An apparatus as claimed in claim 9 further comprising guide rail spacers, guide rail retaining screws and said guide rail spacers are attached by said guide rail retaining screws to each end of said knife guide block rails.

11. An apparatus as in claim 8; wherein said cutter support comprises pivot means.

12. An apparatus as in claim 8; wherein said cutter support comprises adjustment means for extending said cutter support.

13. An apparatus as claimed in claim 1; wherein said base includes a mandrel to form a uniform compacted cavity in said food product.

14. The device of claim 1; wherein the food product is a loaf of bread.

* * * * *